United States Patent
Liu et al.

(10) Patent No.: US 9,140,953 B2
(45) Date of Patent: Sep. 22, 2015

(54) REFLECTIVE DISPLAY APPARATUS

(75) Inventors: Su-Cheng Liu, Hsinchu (TW);
Chi-Ming Wu, Hsinchu (TW)

(73) Assignee: E INK HOLDINGS INC., Hsinchu (TW)

( * ) Notice: Subject to any disclaimer, the term of this patent is extended or adjusted under 35 U.S.C. 154(b) by 228 days.

(21) Appl. No.: 13/226,088

(22) Filed: Sep. 6, 2011

(65) Prior Publication Data

US 2011/0317251 A1     Dec. 29, 2011

Related U.S. Application Data

(63) Continuation of application No. 12/469,616, filed on May 20, 2009, now abandoned.

(30) Foreign Application Priority Data

Feb. 24, 2009   (TW) ................ 98105849 A

(51) Int. Cl.
| | |
|---|---|
| G02B 26/00 | (2006.01) |
| G02F 1/03 | (2006.01) |
| G02F 1/07 | (2006.01) |
| G02F 1/153 | (2006.01) |
| G02F 1/167 | (2006.01) |
| G02F 1/1362 | (2006.01) |

(52) U.S. Cl.
CPC .......... *G02F 1/167* (2013.01); *G02F 1/136209* (2013.01); *G02F 2001/1672* (2013.01); *G02F 2202/28* (2013.01); *G02F 2203/02* (2013.01)

(58) Field of Classification Search
USPC ......... 359/237, 242, 290–292, 295, 296, 298, 359/245, 247, 251–254, 263, 265, 267, 359/269–273, 315, 318, 321–323
See application file for complete search history.

(56) References Cited

U.S. PATENT DOCUMENTS

| | | | |
|---|---|---|---|
| 5,189,500 | A | 2/1993 | Kusunoki |
| 6,339,459 | B1 | 1/2002 | Ichikawa et al. |

(Continued)

FOREIGN PATENT DOCUMENTS

| | | |
|---|---|---|
| CN | 101276117 | 10/2008 |
| EP | 1149325 | 6/2000 |

(Continued)

OTHER PUBLICATIONS

Chinese Patent Office, Office Action issued Nov. 1, 2012.
(Continued)

*Primary Examiner* — Joseph P Martinez
*Assistant Examiner* — Brandi Thomas
(74) *Attorney, Agent, or Firm* — WPAT, PC; Justin King

(57) ABSTRACT

A reflective display apparatus includes a first substrate, a second substrate, a display layer and a light shielding layer. The first substrate has a driving circuit layer and the second substrate has a transparent electrode layer opposite to the driving circuit layer. The display layer is disposed between the driving circuit layer and the transparent electrode layer. The light shielding layer has a first adhering surface and a second adhering surface, wherein the first adhering surface is adhered to the display layer and the second adhering surface is adhered to the driving circuit layer. The light shielding layer can prevent the driving circuit layer from being illuminated by external light rays, and thus display quality of the reflective display apparatus is improved.

13 Claims, 3 Drawing Sheets

(56) References Cited

U.S. PATENT DOCUMENTS

| | | | |
|---|---|---|---|
| 6,618,033 B2 * | 9/2003 | Takafuji | 345/96 |
| 7,009,766 B2 | 3/2006 | Hirata et al. | |
| 7,126,655 B2 * | 10/2006 | Muramatsu | 349/110 |
| 2003/0071941 A1 | 4/2003 | Mizuno | |
| 2007/0018943 A1 * | 1/2007 | Bayrle et al. | 345/102 |
| 2008/0291527 A1 | 11/2008 | Kim et al. | |

FOREIGN PATENT DOCUMENTS

| | | |
|---|---|---|
| JP | 10186333 | 7/1998 |
| JP | 11154216 | 6/1999 |
| JP | 2002-98945 | 4/2002 |
| JP | 2002260426 | 9/2002 |
| JP | 2002296578 | 10/2002 |
| JP | 2003029314 | 1/2003 |
| JP | 2003142498 | 5/2003 |
| JP | 2004-109950 | 4/2004 |
| JP | 2004172529 | 6/2004 |
| JP | 2005258310 | 9/2005 |
| JP | 2008050806 | 3/2008 |
| TW | 200837471 | 9/2008 |

OTHER PUBLICATIONS

China Patent Office Action issued on Feb. 22, 2012.
Japan Patent Office Action issued on Jul. 31, 2012.
Japan Patent Office Action issued on Oct. 17, 2011.
Taiwan Patent Office Official OA issued Sep. 19, 2012.
JP OA, Oct. 4, 2011.
European Patent Office search report issued on Dec. 28, 2011.
Korea Patent Office, "Office Action with English Abstract", Feb. 9, 2015.

* cited by examiner

REFLECTIVE DISPLAY APPARATUS

CROSS-REFERENCE TO RELATED APPLICATIONS

This application is a continuation application of an application Ser. No. 12/469,616, filed on May 20, 2009, and based upon and claims the benefit of priority from the prior Taiwanese Patent Application No. 098105849, filed Feb. 24, 2009, the entire contents of which are incorporated herein by reference.

BACKGROUND

1. Field of the Invention

The present invention relates to a display apparatus, and more particularly, to a reflective display apparatus.

2. Description of the Related Art

Reflective display apparatus is of energy saving due to there is no need of backlight source. In various kinds of reflective display apparatuses, the electrophoretic displays (EPDs) of bistable display technology not only can save energy but also have advantages of high contrast and low cost. Therefore, the electrophoretic displays are more popularly used.

FIG. 1 is schematic view of a conventional electrophoretic display apparatus. Referring to FIG. 1, the conventional electrophoretic apparatus 100 includes a first substrate 110, a second substrate 120 and an electrophoretic layer 130, wherein the electrophoretic layer 130 is disposed between the first substrate 110 and the second substrate 120. The electrophoretic layer 130 includes a plurality of microcapsules, and each of the microcapsules includes a plurality of positive particles and a plurality of negative particles. The positive particle and the negative particle have different colors. The first substrate 110 has a driving circuit layer 112. The driving circuit layer 112 includes a plurality of thin film transistors (TFTs) and a plurality of pixel electrodes respectively and electrically connected with the thin film transistors. The second substrate 120 has a transparent electrode layer 122 opposite to the driving circuit layer 112. The electrophoretic layer 130 is disposed between the driving circuit layer 112 and the transparent electrode layer 122, and the electrophoretic layer 130 is adhered to the driving circuit layer 112 of the first substrate 110 by an optical clear adhesive (OCA).

In the conventional art, external light rays may pass through the optical clear adhesive and illuminate the driving circuit layer, and it results in electrical leakage of the thin film transistors. Thus, the conventional reflective display apparatus may generate residual image, and the contrast and reflectivity of the reflective display apparatus may be decreased, or a cross-talk phenomenon may be generated. Therefore, the display quality of the conventional reflective display apparatus is reduced.

BRIEF SUMMARY

The present invention provides a reflective display apparatus of improved display quantity.

In order for obtaining the above-mentioned advantage, the present invention provides a reflective display apparatus including a first substrate, a second substrate, a display layer and a light shielding layer. The first substrate has a driving circuit layer and the second substrate has a transparent electrode layer opposite to the driving circuit layer. The display layer is disposed between the driving circuit layer and the transparent electrode layer. The light shielding layer has a first adhering surface and a second adhering surface, wherein the first adhering surface is adhered to the display layer and the second adhering surface is adhered to the driving circuit layer.

In one embodiment of the present invention, the light shielding layer includes a light shielding adhesive.

In one embodiment of the present invention, the light shielding layer includes a first transparent adhesive, a second transparent adhesive and a light shielding film. The first transparent adhesive has the first adhering surface and a third adhering surface opposite to the first adhering surface. The second transparent adhesive has the second adhering surface and a fourth adhering surface opposite to the second adhering surface. The light shielding film is disposed between the first transparent adhesive and the second transparent adhesive, and the third adhering surface and the fourth adhering surface are adhered to the light shielding film.

In one embodiment of the present invention, the second substrate is a flexible substrate.

In one embodiment of the present invention, the first substrate is a rigid substrate or a flexible substrate.

In one embodiment of the present invention, the display layer is an electrophoretic layer or a liquid crystal layer.

In one embodiment of the present invention, the display layer is a microcapsule electrophoretic layer.

In one embodiment of the present invention, the display layer is a microcup electrophoretic layer.

In one embodiment of the present invention, material of the light shielding adhesive includes black silicon adhesive.

In one embodiment of the present invention, the first transparent adhesive and the second transparent adhesive are optical clear adhesive.

In one embodiment of the present invention, the light shielding layer includes a transparent adhesive and a light shielding adhesive. The transparent adhesive has the first adhering surface and a third surface opposite to the first adhering surface. The light shielding adhesive has the second adhering surface and a fourth adhering surface opposite to the second adhering surface, and the fourth adhering surface is adhered to the third surface.

In one embodiment of the present invention, the light shielding layer includes a light shielding adhesive and a transparent adhesive. The light shielding adhesive has the first adhering surface and a third surface opposite to the first adhering surface. The transparent adhesive has the second adhering surface and a fourth adhering surface opposite to the second adhering surface, and the fourth adhering surface is adhered to the third surface.

In the present invention, the light shielding layer adhered to the driving circuit layer can prevent the driving circuit layer from being illuminated by external light rays, and therefore can prevent elements in the driving circuit layer from generating electrical leakage resulted from being illuminated by external light ray. Thus, the reflective display apparatus has improved display quality.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
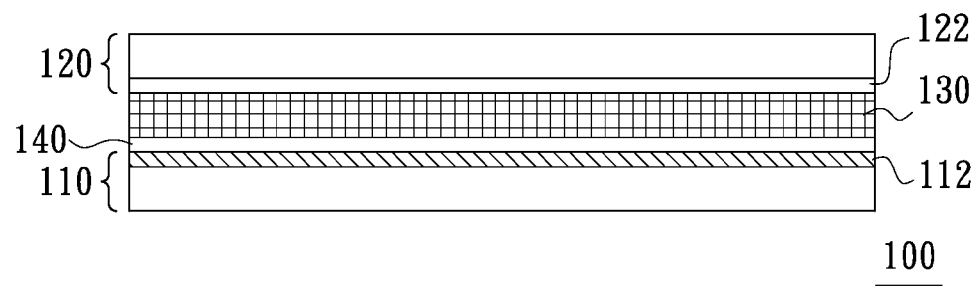
FIG. 1 is schematic view of a conventional electrophoretic display apparatus.
Figure 2:
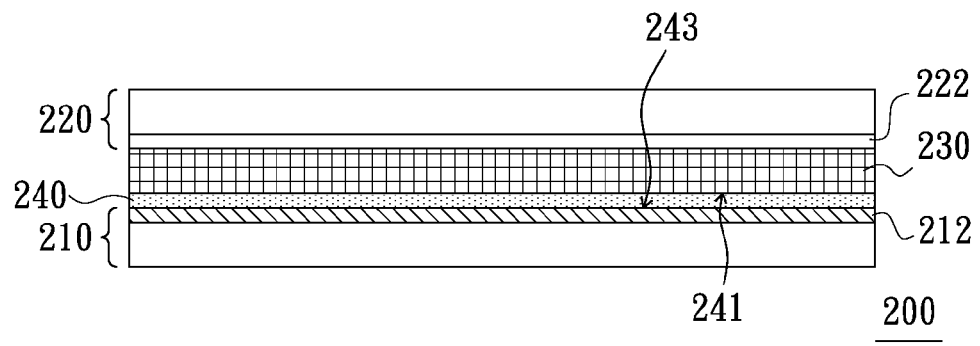
FIG. 2 is schematic view of a reflective display apparatus of an embodiment of the present invention.

FIG. 2 is schematic view of a reflective display apparatus of an embodiment of the present invention. Referring to FIG. 2, the reflective display apparatus 200 includes a first substrate 210, a second substrate 220, a display layer 230 and a light shielding layer 240. The first substrate 210 has a driving circuit layer 212, and the second substrate 220 has a transparent electrode layer 222 opposite to the driving circuit layer 212. The display layer 230 is disposed between the driving circuit layer 212 and the transparent electrode layer 222. The light shielding layer 240 has a first adhering surface 241 and a second adhering surface 243, wherein the first adhering surface 241 is adhered to the display layer 230 and the second adhering surface 243 is adhered to the driving circuit layer 212.

The reflective display apparatus 200 may be an electrophoretic display apparatus or a liquid crystal display apparatus, but is not limited. In the embodiment that the reflective display apparatus 200 is the electrophoretic display apparatus, the display layer 230 is an electrophoretic layer. The electrophoretic layer can be a microcapsule electrophoretic layer which includes a plurality of microcapsules. Each of the microcapsules includes a plurality of positive particles and a plurality of negative particles, wherein the positive particle and the negative particle have different colors. The electrophoretic layer also can be a microcup electrophoretic layer which includes a plurality of microcups. Each of the microcups includes a plurality of positive particles and a plurality of negative particles, wherein the positive particle and the negative particle have different colors. In the embodiment that the reflective display apparatus 200 is the liquid crystal display apparatus, the display layer 230 is a liquid crystal layer. Material of the transparent electrode layer 222 includes indium tin oxide (ITO), indium zinc oxide (IZO), zinc oxide, or indium gallium zinc oxide (IGZO), but is not limited. The first substrate 210 may be a rigid substrate or a flexible substrate. The second substrate 220 may, for example, be a flexible substrate. The driving circuit layer 212, for example, includes a plurality of active elements and a plurality of pixel electrodes, wherein the active elements are, for example, formed in array, and the pixel electrodes respectively and electrically connect to the active elements. The active elements are, for example, thin film transistors.

The light shielding layer 240 is, for example, a light shielding adhesive, and material of the light shielding adhesive may include black silicon adhesive. The display layer 230 is adhered to the driving circuit layer 212 of the first substrate 210 by the light shielding layer 240, and the light shielding layer 240, for example, covers the entire driving circuit layer 212. The light shielding layer 240 can not only be used to adhere the display layer 230 to the driving circuit layer 212 of the first substrate 210, but also can prevent the driving circuit layer 212 from being illuminated by external light rays.

In the present embodiment, the light shielding layer 240 prevents the driving circuit layer 212 from being illuminated by external light rays, and this can prevent the active elements in the driving circuit layer 212 from generating electrical leakage which is resulted from being illuminated by external light rays. Therefore, residual image and cross-talk are eliminated, and the contrast and reflectivity of the reflective display apparatus 200 are improved. Thus, the reflective display apparatus 200 of the present embodiment has improved display quality.

Figure 3:
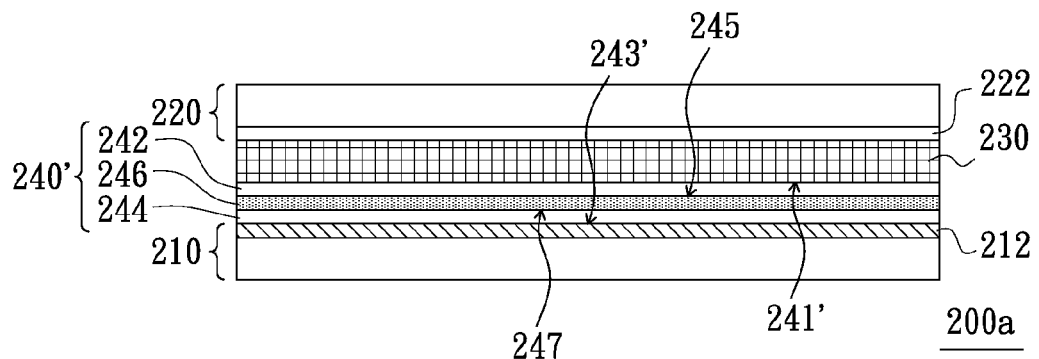
FIG. 3 is a schematic view of a reflective display apparatus of another embodiment of the present invention.

FIG. 3 is a schematic view of a reflective display apparatus of another embodiment of the present invention. Referring to FIG. 3, the reflective display apparatus 200a is similar to the reflective display apparatus 200 in FIG. 2, the difference is in the light shielding layer, and therefore the light shielding layer 240' of the reflective display apparatus 200a is described in details.

The light shielding layer 240' of the reflective display apparatus 200a includes a first transparent adhesive 242, a second transparent adhesive 244 and a light shielding film 246, wherein the light shielding film 246 is disposed between the first transparent adhesive 242 and the second transparent adhesive 244. More specifically, the first transparent adhesive 242 and the second transparent adhesive 244 are, for example, optical clear adhesive. The first transparent adhesive 242 has a first adhering surface 241' and a third adhering surface 245 opposite to the first adhering surface 241'. The second transparent adhesive 244 has a second adhering surface 243' and a fourth adhering surface 247 opposite to the second adhering surface 243'. The first adhering surface 241' is adhered to the display layer 230, the second adhering surface 243' is adhered to the driving circuit layer 212 of the first substrate 210, and the third adhering surface 245 and the fourth adhering surface 247 are adhered to the light shielding film 246. In other words, in the present embodiment, the non-sticky light shielding film 246 is adhered between the driving circuit layer 212 of the first substrate 210 and the display layer 230 by the first transparent adhesive 242 and the second transparent adhesive 244, so that the light shielding film 246 can prevent the driving circuit layer 212 of the first substrate 210 from being illuminated by external light rays. Therefore, the reflective display apparatus 200a of the present embodiment has same advantages as the reflective display apparatus 200.

Figure 4:
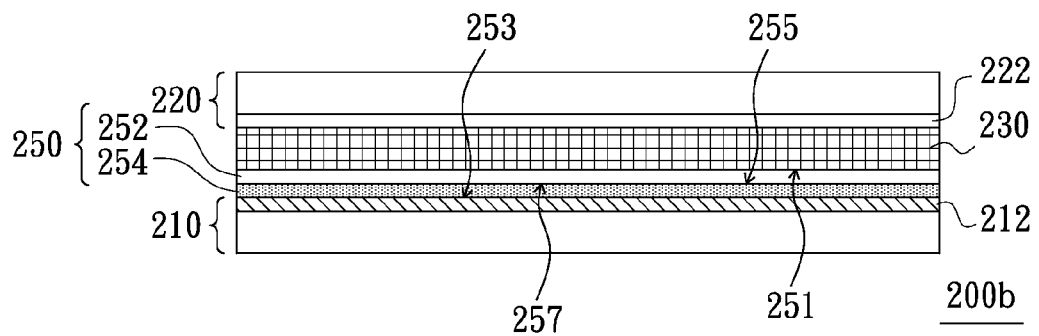
FIG. 4 is a schematic view of a reflective display apparatus of another embodiment of the present invention.

FIG. 4 is a schematic view of a reflective display apparatus of another embodiment of the present invention. Referring to FIG. 4, the reflective display apparatus 200b is similar to the reflective display apparatus 200 in FIG. 2, the difference is in the light shielding layer, and therefore the light shielding layer 250 of the reflective display apparatus 200b is described in details.

The light shielding layer 250 of the reflective display apparatus 200b includes a transparent adhesive 252 and a light shielding adhesive 254. The transparent adhesive 252 has a first adhering surface 251 and a third surface 255 opposite to the first adhering surface 251. The transparent adhesive 254 has a second adhering surface 253 and a fourth adhering surface 257 opposite to the second adhering surface 253, and the fourth adhering surface 257 is adhered to the third surface 255. The first adhering surface 251 is adhered to the display layer 230, the second adhering surface 253 is adhered to the driving circuit layer 212 of the first substrate 210, and the fourth adhering surface 257 is adhered to the third surface 255.

The transparent adhesive 252 is, for example, optical clear adhesive, and material of the light shielding adhesive 254 may include black resin, but is not limited. The transparent adhesive 252 is, for example, adhered to the display layer 230 after the display layer 230 is manufactured. Then, when the display layer 230 is assembled to the first substrate 210, the transparent adhesive 252 adhered to the display layer 230 is adhered to the first substrate 210 by the light shielding adhesive 254, so that the display layer 230 is adhered to the first substrate 210.

In the present embodiment, the light shielding adhesive 254 is used to prevent the driving circuit layer 212 of the first substrate 210 from being illuminated by external light rays. Therefore, the reflective display apparatus 200b of the present embodiment has same advantages as the reflective display apparatus 200.

Figure 5:
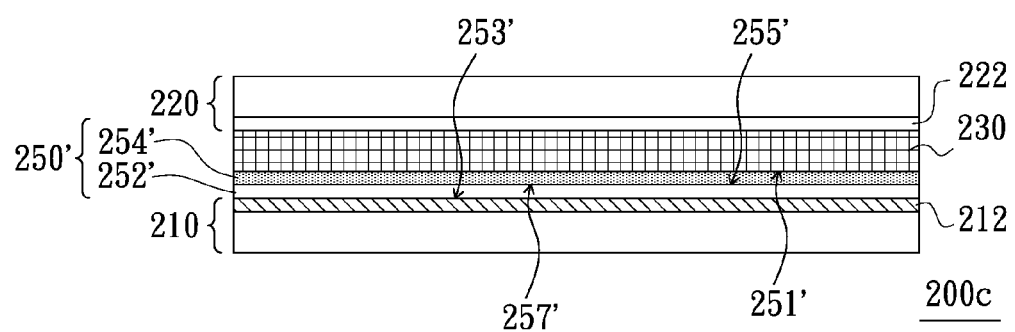
FIG. 5 is a schematic view of a reflective display apparatus of another embodiment of the present invention.

FIG. 5 is a schematic view of a reflective display apparatus of another embodiment of the present invention. Referring to FIG. 5, the reflective display apparatus 200c is similar to the reflective display apparatus 200 in FIG. 2, the difference is in the light shielding layer, and therefore the light shielding layer 250' of the reflective display apparatus 200c is described in details.

The light shielding layer 250' of the reflective display apparatus 200c includes a transparent adhesive 252' and a light shielding adhesive 254'. The light shielding adhesive 254' has a first adhering surface 251' and a third surface 255' opposite to the first adhering surface 251'. The transparent adhesive 252' has a second adhering surface 253' and a fourth adhering surface 257' opposite to the second adhering surface 253', and the fourth adhering surface 257' is adhered to the third surface 255'. The first adhering surface 251' is adhered to the display layer 230, the second adhering surface 253' is adhered to the driving circuit layer 212 of the first substrate 210, and the fourth adhering surface 257' is adhered to the third surface 255'.

The transparent adhesive 252' is, for example, optical clear adhesive, and material of the light shielding adhesive 254' may include black resin, but is not limited. The light shielding adhesive 254' is, for example, adhered to the display layer 230 after the display layer 230 is manufactured. Then, when the display layer 230 is assembled to the first substrate 210, the light shielding adhesive 254' adhered to the display layer 230 is adhered to the first substrate 210 by the transparent adhesive 252', so that the display layer 230 is adhered to the first substrate 210.

In the present embodiment, the light shielding adhesive 254' is used to prevent the driving circuit layer 212 of the first substrate 210 from being illuminated by external light rays. Therefore, the reflective display apparatus 200c of the present embodiment has same advantages as the reflective display apparatus 200.

In summary, because the light shielding layer of the reflective display apparatus is adhered to the driving circuit layer, the light shielding layer can be used to prevent the driving circuit layer from being illuminated by external light rays. This can prevent the active elements in the driving circuit layer from generating electrical leakage resulted from being illuminated by external light ray. Thus, the reflective display apparatus has improved display quality.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A reflective display apparatus comprising:
   a first substrate having a driving circuit layer, the driving circuit layer comprising a plurality of active elements and a plurality of pixel electrodes, the active elements being formed in array, the pixel electrodes being respectively and electrically connected to the active elements;
   a second substrate having a transparent electrode layer opposite to the driving circuit layer, wherein the transparent electrode layer faces an outside light source;
   an electrophoretic layer disposed between the driving circuit layer and the transparent electrode layer; and
   a light shielding layer having a first adhering surface and a second adhering surface, wherein the light shielding layer is disposed between the driving circuit layer and the electrophoretic layer, the first adhering surface is adhered to the electrophoretic layer and the second adhering surface is adhered to the driving circuit layer;
   wherein the light shielding layer completely covers the driving circuit layer to shield the active elements and the pixel electrodes from receiving a light of the outside light source penetrating through the electrophoretic layer, and material of the light shielding layer comprises organic adhesive.

2. The reflective display apparatus as claimed in claim 1, wherein the light shielding layer includes a light shielding adhesive.

3. The reflective display apparatus as claimed in claim 1, wherein the light shielding layer comprises:
   a first transparent adhesive having the first adhering surface and a third adhering surface opposite to the first adhering surface;
   a second transparent adhesive having the second adhering surface and a fourth adhering surface opposite to the second adhering surface; and
   a light shielding film disposed between the first transparent adhesive and the second transparent adhesive, and the third adhering surface and the fourth adhering surface being adhered to the light shielding film.

4. The reflective display apparatus as claimed in claim 3, wherein the first transparent adhesive and the second transparent adhesive are optical clear adhesive.

5. The reflective display apparatus as claimed in claim 1, wherein the second substrate is a flexible substrate.

6. The reflective display apparatus as claimed in claim 1, wherein the first substrate is a rigid substrate or a flexible substrate.

7. The reflective display apparatus as claimed in claim 2, wherein the organic adhesive includes black silicon adhesive.

8. The reflective display apparatus as claimed in claim 1, wherein the light shielding layer comprises:
   a transparent adhesive having the first adhering surface and a third surface opposite to the first adhering surface; and
   a light shielding adhesive having the second adhering surface and a fourth adhering surface opposite to the second adhering surface, and the fourth adhering surface being adhered to the third surface.

9. The reflective display apparatus as claimed in claim 1, wherein the light shielding layer comprises:
   a light shielding adhesive having the first adhering surface and a third surface opposite to the first adhering surface; and
   a transparent adhesive having the second adhering surface and a fourth adhering surface opposite to the second adhering surface, and the fourth adhering surface being adhered to the third surface.

10. The reflective display apparatus as claimed in claim 1, wherein the display layer is a microcapsule electrophoretic layer.

11. The reflective display apparatus as claimed in claim 1, wherein the display layer is a microcup electrophoretic layer.

12. The reflective display apparatus as claimed in claim 1, wherein the organic adhesive comprises silicon adhesive or resin.

13. The reflective display apparatus as claimed in claim 1, wherein the active elements are thin film transistors.

* * * * *